US008931261B2

(12) United States Patent
Carroll, III et al.

(10) Patent No.: US 8,931,261 B2
(45) Date of Patent: *Jan. 13, 2015

(54) APPARATUS, SYSTEM, AND METHOD FOR DIVERTING FLUID

(71) Applicant: Cummins Filtration IP, Inc., Minneapolis, MN (US)

(72) Inventors: John T. Carroll, III, Columbus, IN (US); Laszlo D. Tikk, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,005

(22) Filed: Dec. 5, 2012

(65) Prior Publication Data

US 2013/0340411 A1 Dec. 26, 2013

Related U.S. Application Data

(63) Continuation of application No. 12/454,897, filed on May 26, 2009, now Pat. No. 8,418,440, which is a continuation of application No. 11/760,141, filed on Jun. 8, 2007, now Pat. No. 7,845,162, which is a continuation-in-part of application No. 11/156,682, filed on Jun. 20, 2005, now Pat. No. 7,334,399.

(51) Int. Cl.
| | |
|---|---|
| *F01N 3/00* | (2006.01) |
| *F02M 37/00* | (2006.01) |
| *F01N 3/20* | (2006.01) |
| *F01N 3/36* | (2006.01) |

(52) U.S. Cl.
CPC ......... *F02M 37/0047* (2013.01); *F01N 3/2066* (2013.01); *F01N 3/36* (2013.01); *F01N 2270/02* (2013.01); *F01N 2610/03* (2013.01); *F01N 2610/14* (2013.01); *F01N 2610/1446* (2013.01); *Y02T 10/24* (2013.01)
USPC .................. 60/286; 60/274; 60/285; 60/295; 60/303; 123/446; 123/457; 123/461; 123/514

(58) Field of Classification Search
USPC ............ 60/274, 285, 286, 295, 303; 123/445, 123/446, 447, 455, 456, 457, 461, 514, 515
See application file for complete search history.

(56) References Cited

U.S. PATENT DOCUMENTS

| | | | |
|---|---|---|---|
| 3,761,229 A | 9/1973 | Schwartz | |
| 3,945,204 A * | 3/1976 | Knapp | ............................ 60/274 |
| 5,189,876 A * | 3/1993 | Hirota et al. | ..................... 60/286 |
| 5,850,735 A | 12/1998 | Araki et al. | |

(Continued)

OTHER PUBLICATIONS

International Searching Authority. International Search Report and Written Opinion of the International Searching Authority. PCT/US2008/066348. Jun. 11, 2009.

*Primary Examiner* — Binh Q Tran
(74) *Attorney, Agent, or Firm* — Krieg DeVault LLP

(57) ABSTRACT

A pump component is removed from a port of a suction-side fluid cavity of a high-pressure fluid pump. The pump component performs a pump function for the high-pressure fluid pump. A primary coupler connects to the port. The pump component connects to the primary coupler. A diverter fluid passage diverts a low-pressure fluid from the primary coupler to an auxiliary fluid delivery system. The primary coupler communicates the low-pressure fluid through the pump component and primary coupler to the port.

14 Claims, 9 Drawing Sheets

(56) References Cited

U.S. PATENT DOCUMENTS

| | | |
|---|---|---|
| 6,138,638 A | 10/2000 | Morikawa |
| 6,209,315 B1 | 4/2001 | Weigl |
| 6,446,609 B2 | 9/2002 | Mizune et al. |
| 6,513,323 B1 | 2/2003 | Weigl et al. |
| 6,536,209 B2 | 3/2003 | Fluga et al. |
| 6,834,496 B2 | 12/2004 | Nakatani et al. |
| 6,895,937 B2 * | 5/2005 | Namekawa et al. ........... 123/447 |
| 6,922,988 B2 | 8/2005 | Yamaguchi et al. |
| 6,928,806 B2 | 8/2005 | Tennison et al. |
| 7,069,721 B2 | 7/2006 | Gotou |
| 7,111,456 B2 * | 9/2006 | Yoshida et al. .................. 60/301 |
| 7,143,576 B2 | 12/2006 | Oono |
| 7,281,520 B2 * | 10/2007 | Klenk et al. ................... 123/446 |
| 7,793,642 B2 * | 9/2010 | Yonemoto et al. ............. 123/514 |
| 7,845,336 B2 | 12/2010 | Burkitt et al. |
| 7,992,377 B2 * | 8/2011 | Brown ............................ 60/286 |
| 8,418,440 B2 * | 4/2013 | Carroll et al. ................... 60/286 |
| 2006/0016432 A1 | 1/2006 | Koehler et al. |
| 2006/0169252 A1 | 8/2006 | Ludwig et al. |
| 2006/0231076 A1 | 10/2006 | Magel |
| 2007/0227504 A1 | 10/2007 | Carroll et al. |

* cited by examiner

APPARATUS, SYSTEM, AND METHOD FOR DIVERTING FLUID

CROSS-REFERENCES TO RELATED APPLICATIONS

The present application is a continuation of U.S. patent application Ser. No. 12/454,897, filed May 26, 2009, which is a continuation of U.S. patent application Ser. No. 11/760,141, filed Jun. 8, 2008, which is a continuation-in-part of U.S. patent application Ser. No.11/156,682 , filed Jun. 20, 2005, now U.S. Pat. No. 7,334,399, each of which are incorporated herein by reference.

BACKGROUND OF THE INVENTION

1. Field of the Invention

This invention relates to diverting fluid and more particularly relates to diverting fluid from a high-pressure pump.

2. Description of the Related Art

A mechanical device such as an internal combustion engine often includes a high-pressure fluid pump. For example, a diesel engine may include a high-pressure fuel pump to deliver fuel from a storage tank to a fuel injection system. The mechanical device typically requires the high-pressure fluid pump to deliver the fluid within specified flow rate and pressure ranges. Devices receiving the fluid often only function properly if the fluid is within the specified flow rate and pressure ranges. The high-pressure fluid pump may require one or more pumps, filters, regulators, controllers, and the like to supply the fluid within the specified flow rate and pressure ranges.

The mechanical device may also have a secondary use for the fluid. For example, a catalytic converter of an internal combustion engine is often regenerated by intermittently injecting fuel into the exhaust gas upstream of the converter. Unfortunately, the diversion of fuel from a high-pressure fluid pump may reduce the flow rate and fluid pressure below the specified flow rate and pressure ranges. As a result, the mechanical device may require a costly separate auxiliary fluid supply system including additional pumps, filters, regulators, and controllers to supply the secondary fluid use without disrupting the high-pressure fluid pump supply.

The cost of the auxiliary fluid delivery system may be reduced if a low-pressure fluid upstream of the high-pressure fluid pump can be diverted and used. Unfortunately, the low-pressure fluid may not be easily accessible, particularly in a system with an integrated high-pressure fluid pump and low-pressure fluid pump that is not configured to provide the low-pressure fluid.

SUMMARY OF THE INVENTION

From the foregoing discussion it is apparent that there is a need for an apparatus, system and method for diverting fluid. Beneficially, such an apparatus, system, and method would reduce the space and cost required to deliver low-pressure fluid within a mechanical device. The present invention has been developed in response to the present state of the art, and in particular, in response to the problems and needs in the art that have not yet been fully solved by currently available fluid diversion systems. Accordingly, the present invention has been developed to provide an apparatus, system, and method for diverting fluid that overcome many or all of the above-discussed shortcomings in the art.

The apparatus to divert is provided with a plurality of elements configured to functionally execute the necessary steps of removing a pump component, connecting a primary coupler, connecting the pump component, divert a low-pressure fluid, and communicating the low-pressure fluid through the pump component and primary coupler. The apparatus includes the primary coupler and a diverter fluid passage.

The primary coupler is configured to connect to a port of a suction-side fluid cavity of a high-pressure fluid pump. The port is configured to receive the pump component. The pump component performs a pump function for the high-pressure fluid pump.

The diverter fluid passage diverts a low-pressure fluid from the primary coupler to an auxiliary fluid delivery system. The primary coupler connects to the pump component and communicates the low-pressure fluid to the pump component. The apparatus diverts the low-pressure fluid that may otherwise by inaccessible.

A system of the present invention is also presented for diverting fluid. The system may be embodied in a diesel engine. In particular, the system, in one embodiment, includes a high-pressure fluid pump, a pump component, an auxiliary fluid delivery system, a primary coupler, and a diverter fluid passage.

The high-pressure fluid pump includes a port to a suction-side fluid cavity. The pump component performs a pump function for the high-pressure fluid pump. The port is configured to receive the pump component. The auxiliary fluid delivery system is configured to deliver a fluid.

The primary coupler connects to the port. In addition, the primary coupler communicates low-pressure fluid to the pump component. The diverter fluid passage diverts the low-pressure fluid from the primary coupler to the auxiliary fluid delivery system. The system diverts inaccessible low-pressure fluid to the auxiliary fluid delivery system, reducing the cost of adding the auxiliary fluid delivery system.

A method of the present invention is also presented for intermittently delivering fluid. The method in the disclosed embodiments substantially includes the steps necessary to carry out the functions presented above with respect to the operation of the described apparatus and system. In one embodiment, the method includes removing a pump component, connecting a primary coupler, connecting the pump component, diverting a low-pressure fluid, and communicating the low-pressure fluid through the pump component and primary coupler.

A pump component is removed from a port of a suction-side fluid cavity of a high-pressure fluid pump. The pump component performs a pump function for the high-pressure fluid pump. A primary coupler connects to the port. The pump component connects to the primary coupler. A diverter fluid passage diverts a low-pressure fluid from the primary coupler to an auxiliary fluid delivery system. The primary coupler communicates the low-pressure fluid through the pump component and primary coupler to the port. The method diverts the low-pressure fluid for use by the auxiliary fluid delivery system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The embodiment of the present invention diverts low-pressure fluid from a high-pressure fluid pump. The present invention may supply an auxiliary fluid delivery system with the low-pressure fluid in place of a dedicated low-pressure supply system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of pumps, pump components, loads, to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
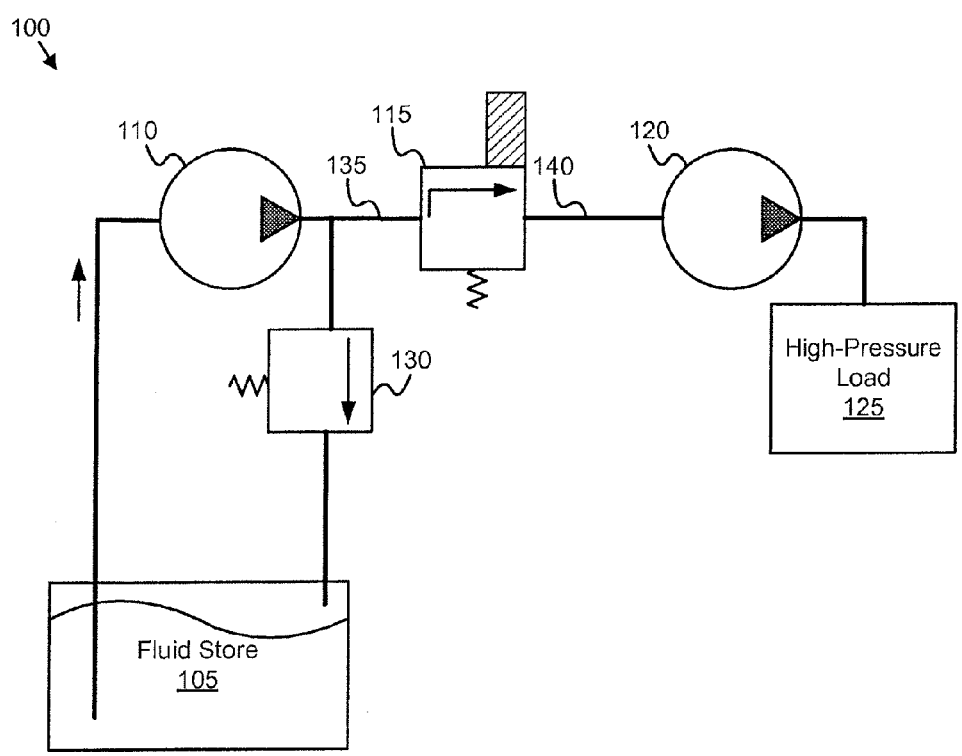
FIG. 1 is a schematic block diagram illustrating one embodiment of a pump system in accordance the present invention.

FIG. 1 is a schematic block diagram illustrating one embodiment of a pump system 100 in accordance the present invention. The system 100 includes a fluid store 105, a low-pressure fluid pump 110, a regulator 130, a pump component 115, a high-pressure fluid pump 120, and a high-pressure load 125.

The low-pressure fluid pump 110 draws fluid from the fluid store 105. The fluid may be a hydrocarbon-based fuel. In one embodiment, the fluid is diesel fuel. Low-pressure fluid exiting from the low-pressure fluid pump 110 may have a pressure in the range of three hundred to three thousand kilopascals (300-3,000 kPa). The regulator 130 regulates the pressure of the fluid delivered to the pump component 115, diverting excess fluid to the fluid store 105 to reduce pressure.

The pump component 115 may be a proportional metering valve. One of skill in the art will recognize that a variety of types of pump components 115 may be used to practice the present invention. A component fluid inlet 135 of the pump component 115 connects to an output of the low-pressure fluid pump 110. In addition, a component fluid outlet 140 of the pump component 115 connects to a port of a suction-side fluid cavity of the high-pressure fluid pump 120. In one embodiment, the pump component 115 regulates the low-pressure fluid delivered to the high-pressure fluid pump 120. For example the pump component 115 may restrict the flow of fluid to the high-pressure fluid pump 120.

The high-pressure fluid pump 120 may deliver high-pressure fluid to the high-pressure load 125. In one embodiment, the high-pressure fluid has a pressure in the range of forty thousand to two hundred fifty thousand kilopascals (40,000-250,000 kPa). In a certain embodiment, the high-pressure fluid has a pressure in the range of seventy-five thousand to one hundred fifty thousand kilopascals (75,000-150,000 kPa). The high-pressure load 125 may be a fuel injection system.

In one embodiment, the low-pressure fluid pump 110, regulator 130, pump component 115 and high-pressure fluid pump 120 forms an integrated unit. Thus the low-pressure fluid exiting from the low-pressure fluid pump 110 is not available for use by an auxiliary fluid delivery system. The present invention diverts low-pressure fluid to supply the auxiliary fluid delivery system as will be described hereafter.

Figure 2:
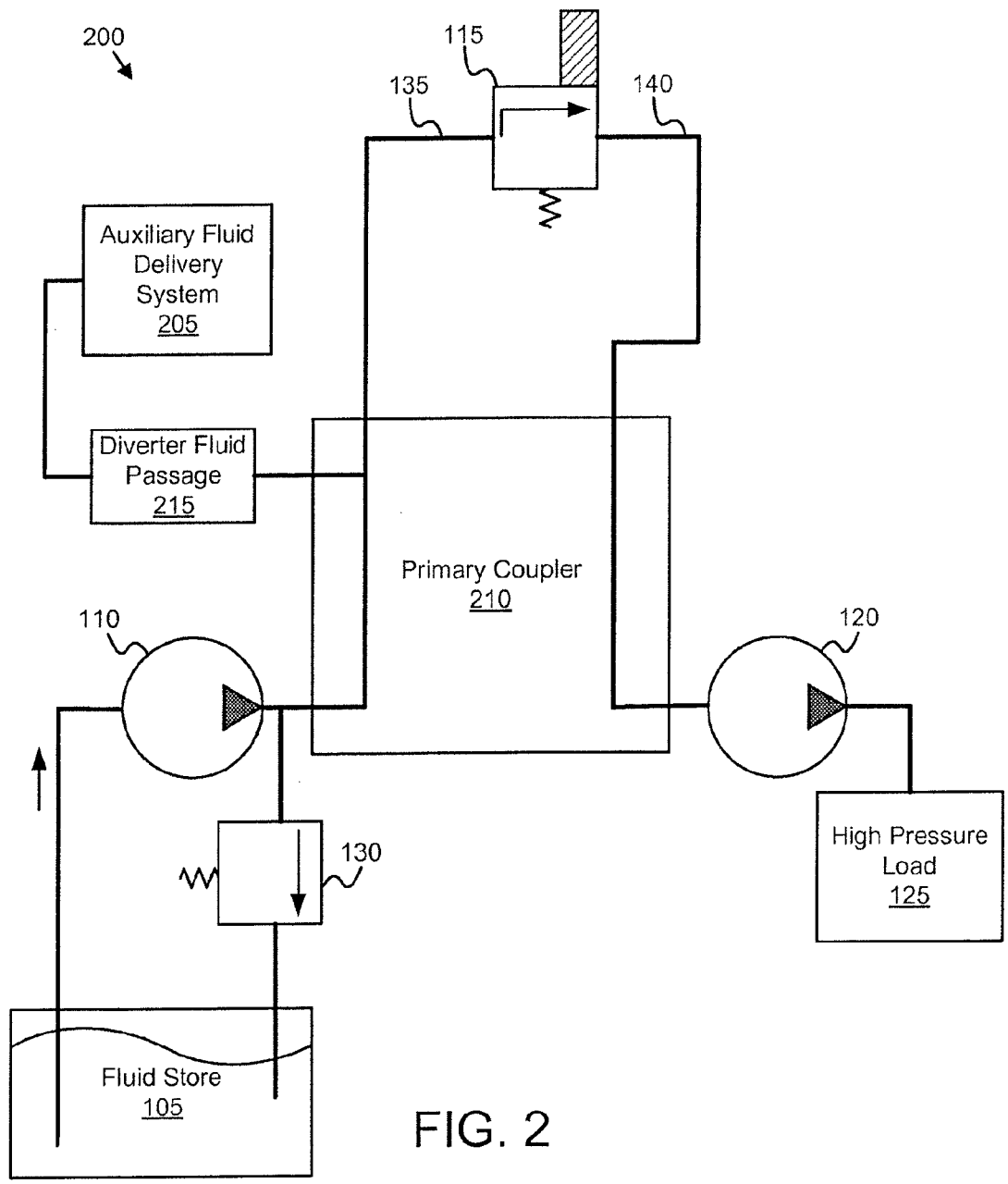
FIG. 2 is a schematic block diagram illustrating one embodiment of a diversion apparatus of the present invention.

FIG. 2 is a schematic block diagram illustrating one embodiment of a diversion apparatus 200 of the present invention. The diversion apparatus 200 diverts fluid from the system 100 of FIG. 1. The apparatus 200 includes the elements of FIG. 1, like numbers referring to like elements. In addition, the apparatus 200 includes an auxiliary fluid delivery system 205, a primary coupler 210, and a diverter fluid passage 215.

The primary coupler 210 connects to the port of the suction-side fluid cavity of the high-pressure fluid pump 120 in place of the pump component 115. In addition, the primary coupler 210 may receive low-pressure fluid from the low-pressure fluid pump 110 and provide the low-pressure fluid to the component fluid inlet 135 of the pump component 115. The primary coupler 210 may also communicate a low-pressure fluid from the component fluid outlet 140 to the port of the high-pressure fluid pump 120. Thus primary coupler 210 connects to the low-pressure fluid pump 110 and high-pressure fluid pump 120 in place of the pump component 115. The primary coupler 210 provides low-pressure fluid to the pump component 115 and transmits low-pressure fluid from the pump component 115 to the high-pressure pump 120.

In addition, the diverter fluid passage 215 diverts a portion of fluid upstream of the pump component 115 to the auxiliary fluid delivery system 205. The auxiliary fluid delivery system 205 and diverter fluid passage 215 will be described hereafter. By taking the place of the pump component 115, the primary coupler 210 allows the diversion of the low-pressure fluid by the diverter fluid passage 215 when the low-pressure fluid may be otherwise unavailable.

Figure 3:
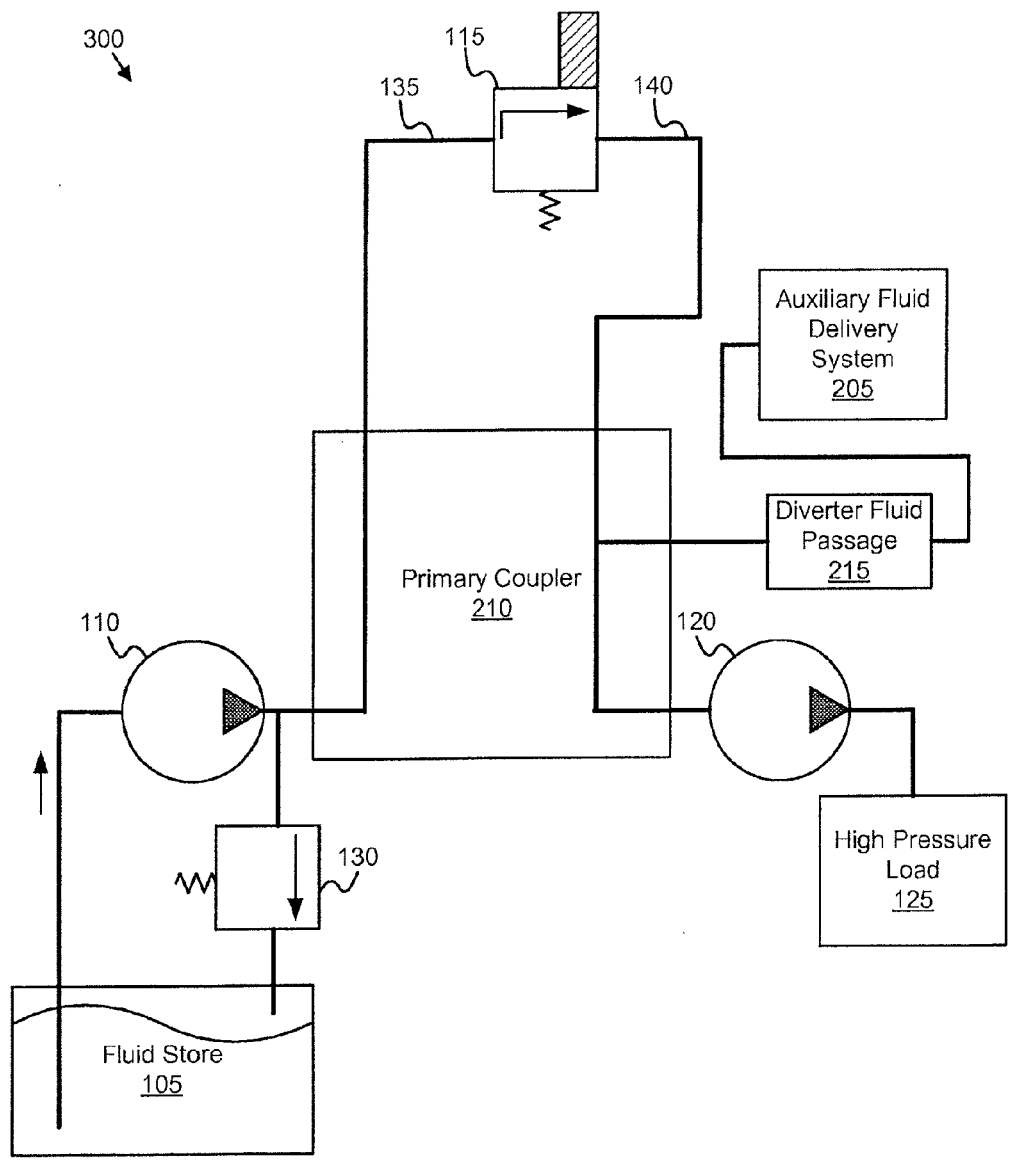
FIG. 3 is a schematic block diagram illustrating one alternate embodiment of a diversion apparatus of the present invention.

FIG. 3 is a schematic block diagram illustrating one alternate embodiment of a diversion apparatus 300 of the present invention. The apparatus 300 includes the primary coupler 210 and diverter fluid passage 215 of FIG. 2. As in FIG. 2, the primary coupler 210 connects to the port of the suction-side fluid cavity of the high-pressure fluid pump 120 in place of the pump component 115, receives low-pressure fluid from the low-pressure fluid pump 110 in place of the pump component 115 and communicates the low-pressure fluid through the pump component 115 to the high-pressure fluid pump 120. The diverter fluid passage 215 diverts a portion of the low-pressure fluid downstream of the pump component 115 to the auxiliary fluid delivery system 205.

Figure 4:
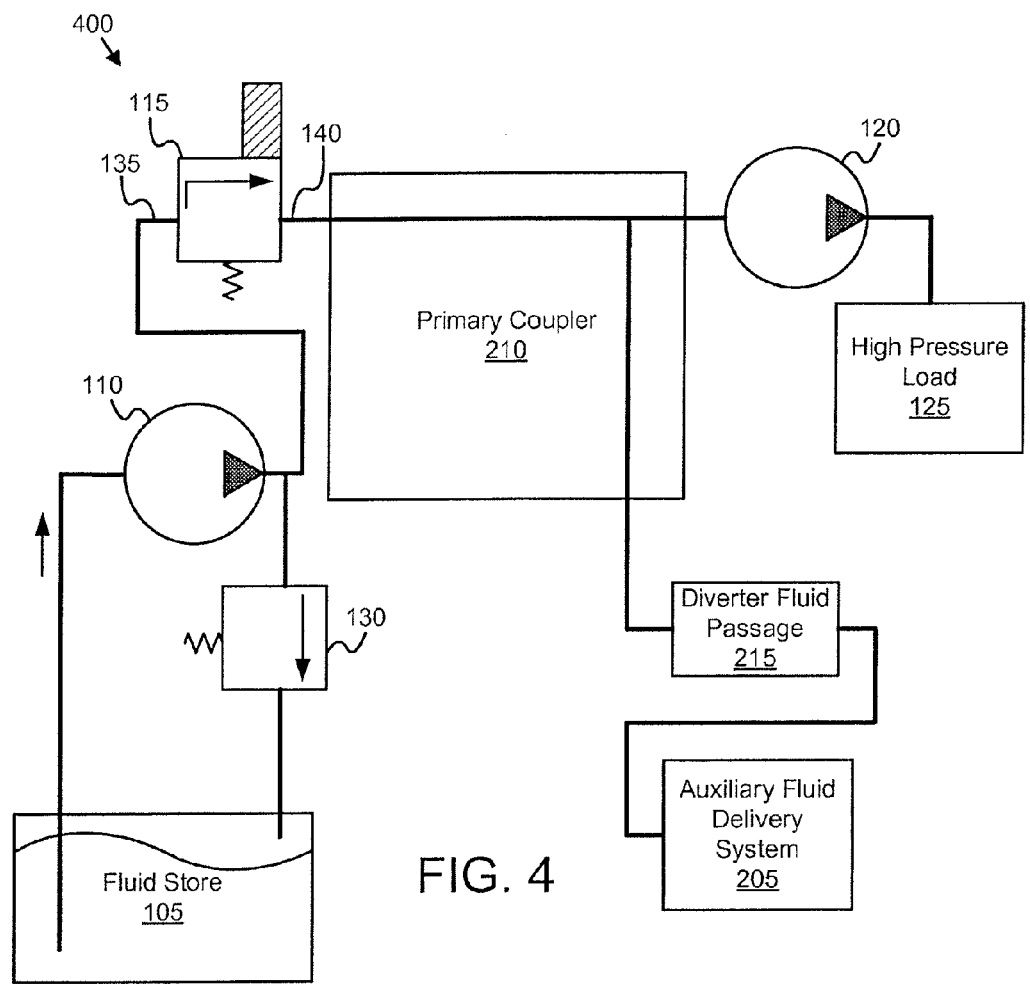
FIG. 4 is a schematic block diagram illustrating one embodiment of a single connection diversion apparatus of the present invention.

FIG. 4 is a schematic block diagram illustrating one embodiment of a single connection diversion apparatus 400 of the present invention. The diversion apparatus 400 diverts fluid from the system 100 of FIG. 1. The apparatus includes the elements of FIGS. 1-3, like numbers referring to like elements.

The low-pressure fluid pump 110 delivers directly to the component fluid inlet 135 of the pump component 115. The low-pressure fluid pump 110 may deliver the fluid through a flexible tube. The pump component 115 connects to the primary coupler 210 instead of to the port of the high-pressure fluid pump 120. The primary coupler 210 connects to the port of the suction-side fluid cavity of the high-pressure fluid pump 120 in place of the pump component 115.

As in FIG. 3, the diverter fluid passage 215 diverts a portion of low-pressure fluid from the pump component 115 to the auxiliary fluid delivery system 205. The apparatus 400 diverts low-pressure fluid downstream of the pump component 115 while allowing the pump component 115 to operate normally within the fluid circuit of the high-pressure fluid pump 120.

Figure 5A:
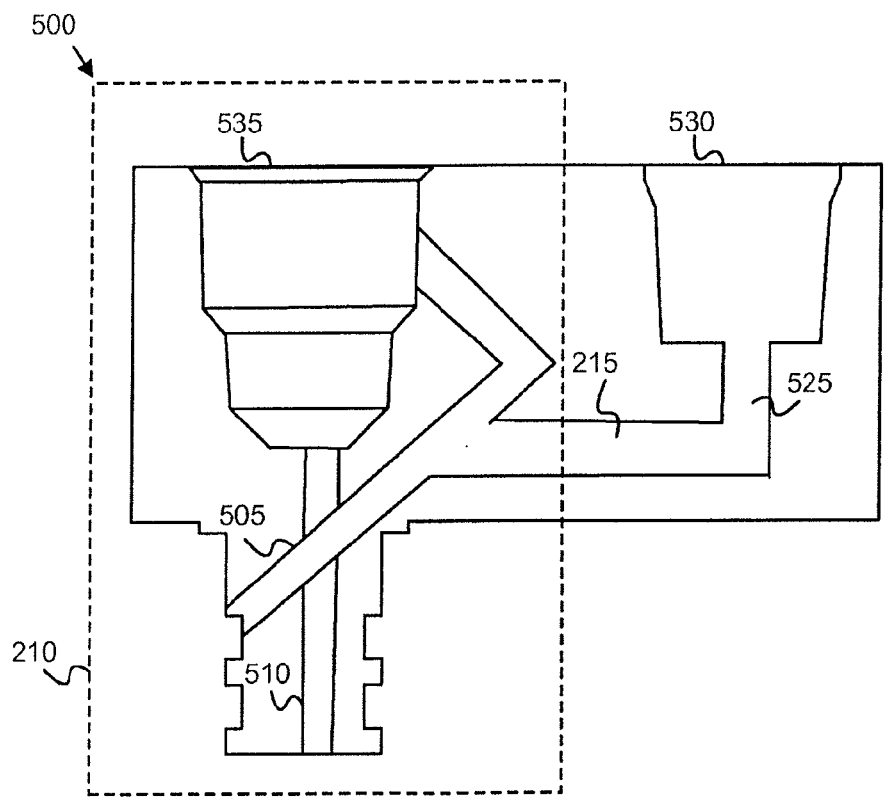
FIG. 5A is a side view drawing illustrating one embodiment of a diversion apparatus of the present invention.

FIG. 5A is a side view drawing illustrating one embodiment of a diversion apparatus 500 of the present invention. The diversion apparatus 500 shows a configuration of the apparatus 200 of FIG. 2. The description of the apparatus 500 refers to elements of FIGS. 1-2, like numbers referring to like elements.

The apparatus 500 includes the primary coupler 210, the diverter fluid passage 215, and an auxiliary connector 530. The pump component 115 connects to the primary coupler 210 at a component connector 535. The component connector 535 may be a drilled bore configured to receive the pump component 115 and seat one or more o-rings.

A port fluid outlet passage that will be described hereafter communicates low-pressure fluid to a coupler fluid inlet passage 505. The coupler fluid inlet passage 505 communicates the low-pressure fluid to the component fluid inlet 135 and to the diverter fluid passage 215. A coupler fluid outlet passage 510 communicates a low-pressure fluid downstream of the pump component 115 from the component fluid outlet 140 to a port fluid inlet passage that will be described hereafter.

In one embodiment, an orifice 525 receives low-pressure fluid from the diverter fluid passage 215 and communicates the low-pressure fluid to the auxiliary connector 530 as will be described hereafter. The auxiliary connector 530 may connect the apparatus 500 to the auxiliary fluid delivery system 205 and deliver the low-pressure fluid to the auxiliary fluid delivery system 205.

The apparatus 500 may be machined from metal and/or a ceramic material. Alternatively, the apparatus 500 may be cast using metal and/or a temperature-resistant plastic.

Figure 5B:
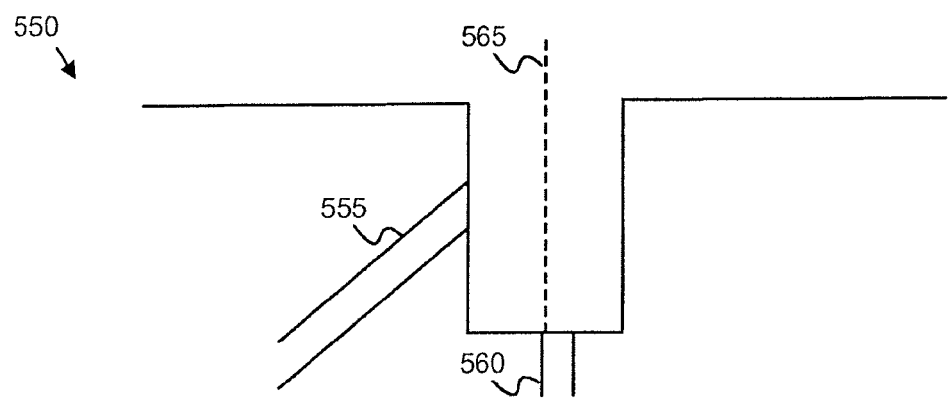
FIG. 5B is a side view drawing illustrating one embodiment of a port of the present invention.

FIG. 5B is a side view drawing illustrating one embodiment of a port 550 of the present invention. The port 550 may be the port of the high-pressure fluid pump 120 of FIGS. 1-4. The port 550 is originally configured to receive the pump component 115. The port 550 may also receive the primary coupler 210 of FIG. 5A.

The port fluid outlet passage 555 may be in communication with the low-pressure fluid that is received from an internal passage of the high-pressure fluid pump 120. The internal passage may receive the low-pressure fluid from the low-pressure fluid pump 110. In one embodiment, the internal passage is inaccessible as the low-pressure fluid pump 110 is integrated with the high-pressure fluid pump 120. The port fluid outlet passage 555 may be configured to connect to either the coupler fluid inlet passage 505 or the component fluid inlet 135.

The port fluid inlet passage 560 communicates with the suction-side fluid cavity of the high-pressure fluid pump 120. The port fluid inlet passage 560 may be configured to connect to either the component fluid outlet 140 or the coupler fluid outlet passage 510.

The port 550 is shown with an axis 565. The port 550 may be configured to receive the pump component 115 in-line along the axis 565. The primary coupler 210 connects to the port 550 in-line along the axis 565.

Figure 6:
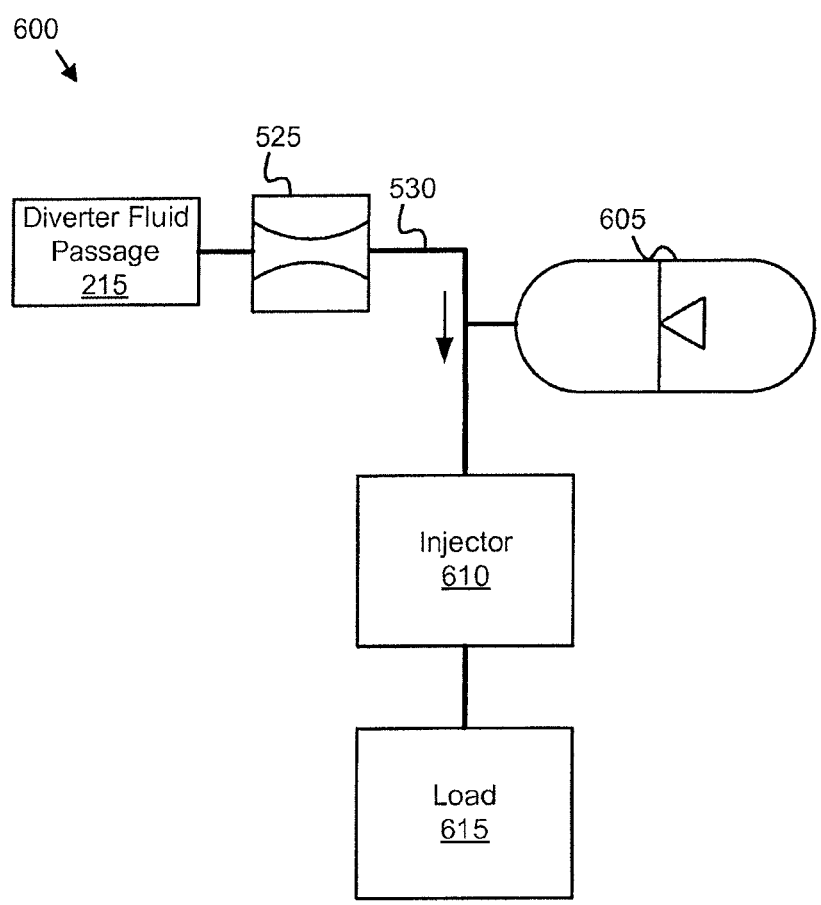
FIG. 6 is a schematic block diagram illustrating one embodiment of an auxiliary fluid delivery system of the present invention.

FIG. 6 is a schematic block diagram illustrating one embodiment of an auxiliary fluid delivery system 600 of the present invention. The auxiliary fluid delivery system 600 may be the auxiliary fluid delivery system 205 of FIGS. 2-4. The description of the system 600 refers to elements of FIGS. 1-5, like numbers referring to like elements. The system 600 shows the diverter fluid passage 215 and includes the orifice 525, the auxiliary connector 530, an accumulator 605, an injector 610, and a load 615.

In one embodiment, the orifice 525 diverts a specified quantity of the low-pressure fluid from the diverter fluid passage 215 over a second time interval. In a certain embodiment, the specified quantity of fluid is in the range of zero point one percent to five percent (0.1%-5%) of the fluid supplied by the high-pressure fluid pump 120. The orifice 525 diverts the specified quantity of fluid over the second time interval. The second time interval may be a time interval between regeneration cycles for a catalytic converter. In one embodiment, the minimum effective area of the orifice A is calculated using Equation 1, where $V_1$ is the volume of the specified quantity of fluid, $T_2$ is the second time interval, $\Delta P$ is difference between a maximum and a minimum of the pressure range of the low-pressure fluid across the orifice 525, and $\rho$ is a fluid density.

$$A \geq \frac{V_1}{\int_0^{T_2} \sqrt{\frac{2\Delta P}{\rho}}\, dt} \qquad \text{Equation 1}$$

In one embodiment, the fluid density ρ is in the range of five hundred to eight hundred kilograms per cubic meter (500-800 kg/m$^3$). The specified quantity may be in the range of five to fifty grams (5-50 g).

The accumulator 605 may accumulate fluid over the second time interval. In one embodiment, the accumulator 605 employs the fluid pressure of low-pressure fluid to accumulate a fluid charge. The accumulator 605 may be configured as a reservoir with a flexible gas-charged diaphragm. The diaphragm may deform in response to the positive pressure of the fluid, increasing the pressure of the diaphragm gas as is well known to those skilled in the art.

The injector 610 intermittently delivers the specified quantity of fluid over a first time interval to the load 615. For example, the injector 610 may deliver the specified quantity of fluid to the load 615 for a first time interval of one second (1 s). The accumulator 605 may then accumulate the specified quantity of fluid over a second time interval. In one embodiment, the second time interval is thirty seconds (30 s).

In one embodiment, the load 615 may be an exhaust gas emission control system such as a catalytic converter. The injector 610 may deliver a fluid such as diesel fuel to the catalytic converter to regenerate the catalytic converter. The auxiliary fluid delivery system 600 regenerates the catalytic converter using the diverted fluid without the cost of an additional low-pressure fluid supply system.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
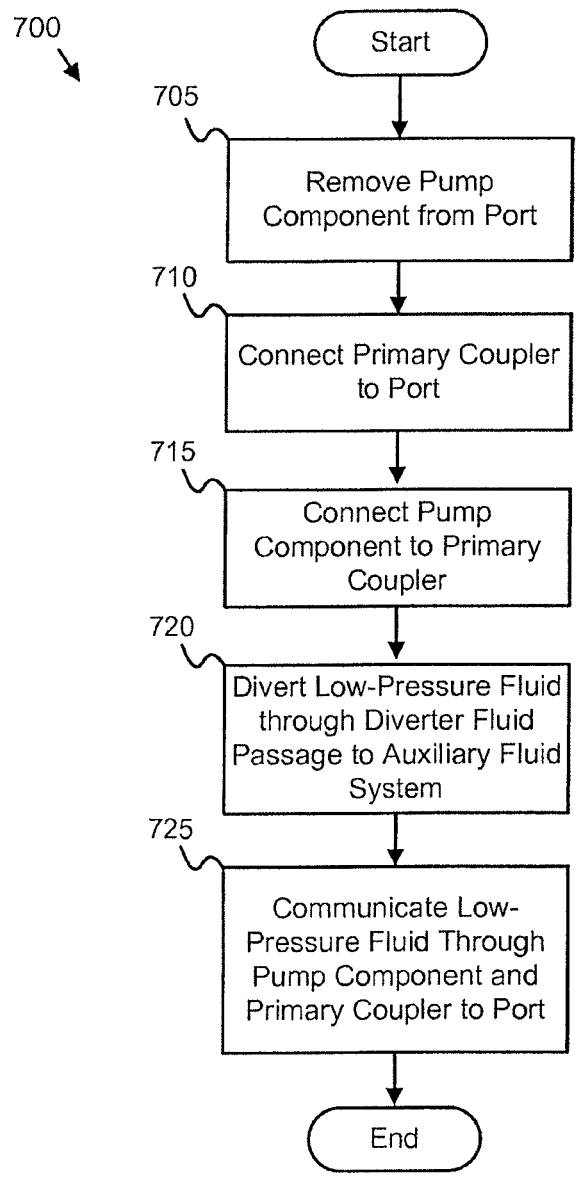
FIG. 7 is a schematic flow chart diagram illustrating one embodiment of a diversion method of the present invention.

FIG. 7 is a schematic flow chart diagram illustrating one embodiment of a diversion method 700 of the present invention. The method 700 substantially includes the steps to carry out the functions presented above with respect to the operation of the described apparatus and system of FIGS. 1-6. The description of the method 700 refers to elements of FIGS. 1-6, like numbers referring to like elements.

The method 700 begins and the pump component 115 is removed 705 from the port 550 of the suction-side fluid cavity of the high-pressure fluid pump 120. The pump component 115 performs a pump function for the high-pressure fluid pump 120.

The primary coupler 210 connects 710 to the port 550. In one embodiment, the primary coupler connects 710 in-line along the axis 565 of the port 550 in place of the pump component 115. Thus the port 550 may not need to be modified to receive the primary coupler 210.

The pump component 115 connects 715 to the primary coupler 210. In one embodiment, the pump component 115 is disposed in-line with the axis 565 of the port 550. In an alternate embodiment, the pump component 115 is disposed at an angle in the range of zero to ninety degrees (0-90°) to the axis 565 of the port 550.

The diverter fluid passage 215 diverts 720 the low-pressure fluid from the primary coupler 210 to the auxiliary fluid delivery system 205. The primary coupler 210 communicates 725 the low-pressure fluid through the pump component 115 to the port 550. Thus the pump component 115 may still perform the pump function and the port 550 receives a low-pressure fluid downstream of the pump component 115. The method 700 diverts the low-pressure fluid to the auxiliary fluid delivery system 205 when the low-pressure fluid is otherwise inaccessible from the high-pressure fluid pump 120.

Figure 8:
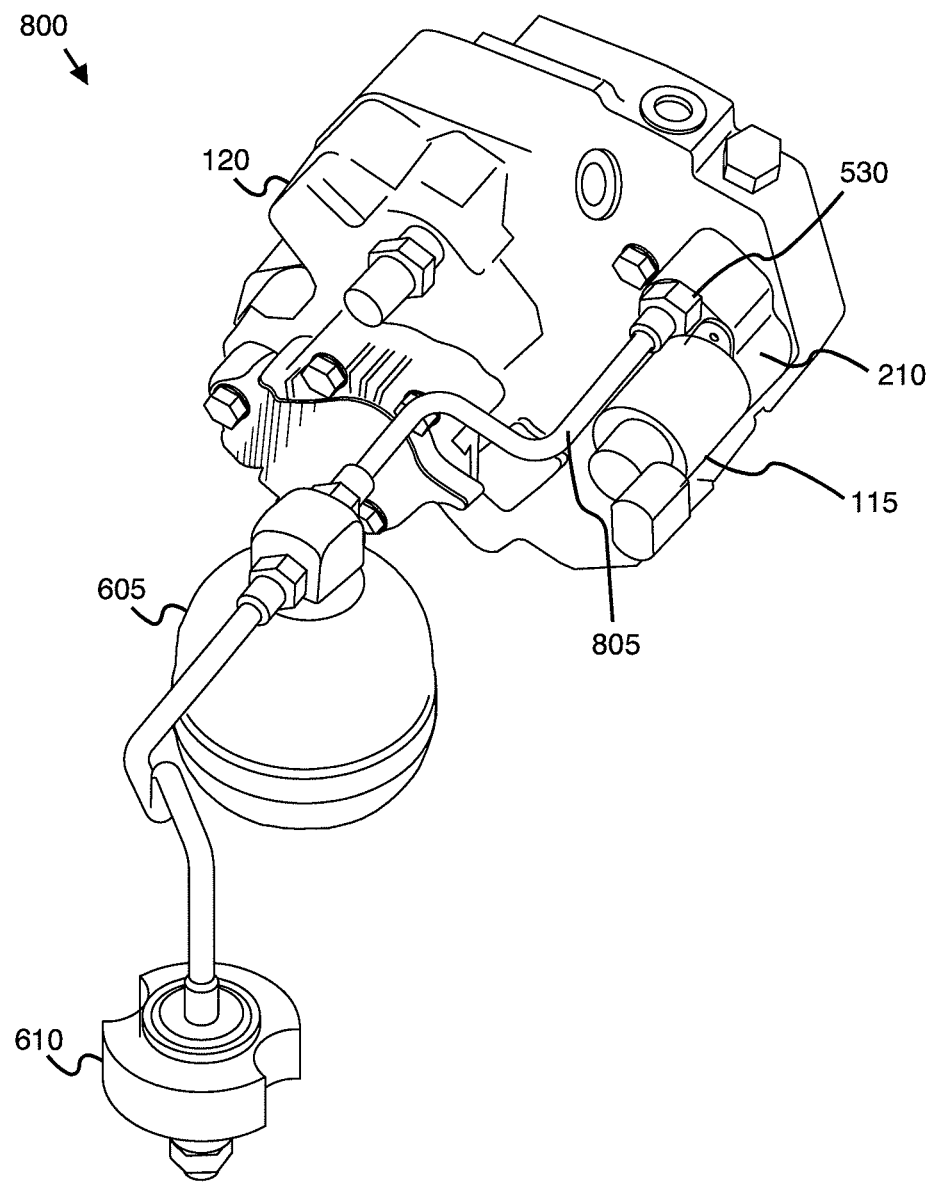
FIG. 8 is an isometric drawing illustrating one embodiment of a pump system with diversion of the present invention.

FIG. 8 is an isometric drawing illustrating one embodiment of a pump system 800 with diversion of the present invention. The description of the pump system 800 refers to elements of FIGS. 1-6, like numbers referring to like elements.

The high-pressure fluid pump 120 may be a LDA V6 Bosch diesel pump. The primary coupler 210 is shown connected to the high-pressure fluid pump 120 at the port 550. The port 550 is obscured by the primary coupler 210. The pump component 115 is connected to the primary coupler 210. As shown, the pump component 115 may be disposed in-line to the axis 565 of the port 550.

Tubing 805 carries the low-pressure fluid from the auxiliary connector 530 to accumulator 605. The accumulator 605 delivers the specified quantity of the fluid to the injector 610. The injector 610 delivers the fluid without the need for an additional low-pressure fluid supply system as the low-pressure fluid is scavenged from the high-pressure fluid pump 120.

Figure 9:
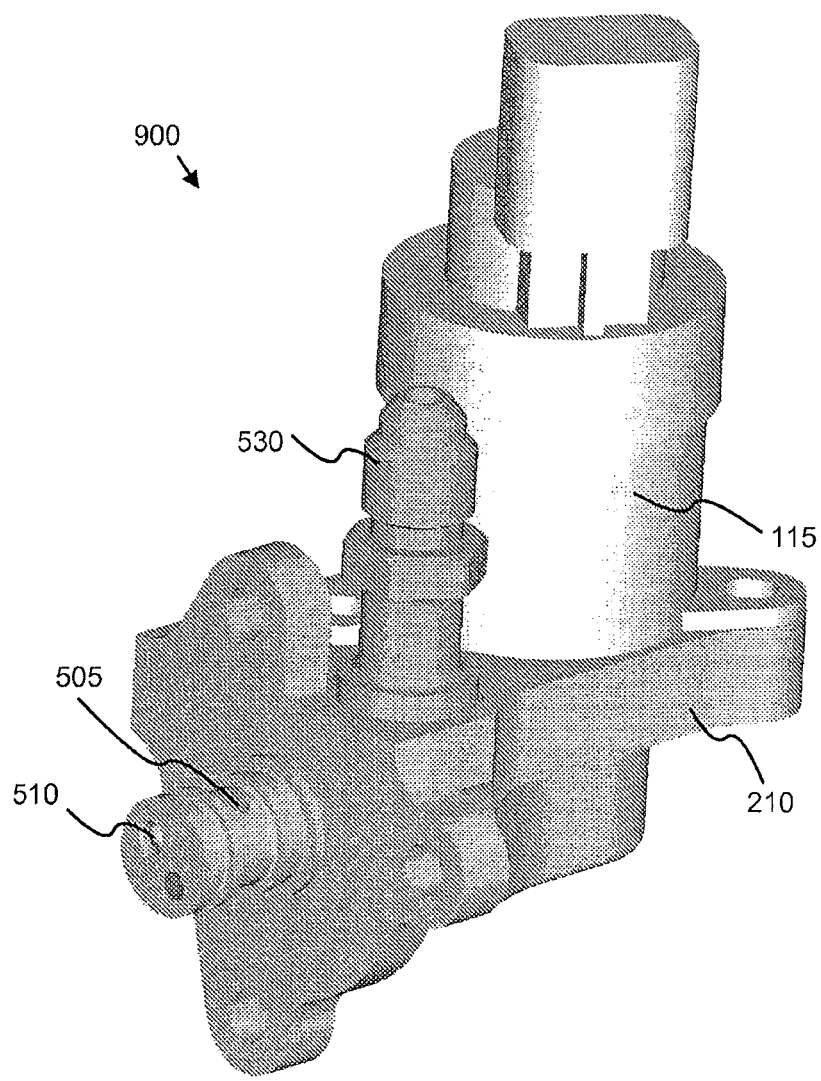
FIG. 9 is an isometric drawing illustrating one alternate embodiment of a pump system with diversion in accordance with present invention.

FIG. 9 is an isometric drawing illustrating one alternate embodiment of a diversion apparatus 900 of the present invention. The diversion apparatus 900 may be the apparatus 200, 300 of FIGS. 2-3. The description of the apparatus 900 refers to elements of FIGS. 1-6, like numbers referring to like elements.

The pump component 115 is shown connected to the primary coupler 210 disposed at a ninety-degree angle (90°) to the axis 565 of the port 550. The auxiliary connector 530 is shown as tubing connector. The coupler fluid inlet passage 505 and coupler fluid outlet passage 510 of the primary coupler 210 are shown where the coupler fluid inlet passage 505 and coupler fluid outlet passage 510 interface to the port fluid outlet passage 555 and port fluid inlet passage 560 respectively, or the port 550.

The embodiment of the present invention diverts low-pressure fluid from the high-pressure fluid pump 120. The present invention may supply the auxiliary fluid delivery system 205 with the low-pressure fluid in place of a dedicated low-pressure supply system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid delivery system for delivery of a fuel, the fluid delivery system comprising:

a primary fuel supply system having a low-pressure fluid pump that is in fluid communication with a high-pressure fluid pump, the low-pressure fluid pump configured to elevate a fuel pressure of the fuel to a first pressure range, the high-pressure fluid pump configured to elevate the fuel pressure of the fuel to a second pressure range, the second pressure range being higher than the first pressure range;

a diversion apparatus having a primary coupler and an auxiliary fluid delivery system, the primary coupler being in fluid communication with the low-pressure fluid pump and the high-pressure fluid pump, the primary coupler configured to divert a portion of a fuel flow from an outlet side of the low-pressure fluid pump to the auxiliary fluid delivery system; and wherein the diversion apparatus is adapted to prevent the fuel flow from dropping below the second pressure range.

2. The fluid delivery system of claim 1, wherein the auxiliary fluid delivery system includes an orifice sized to control a rate of flow of the fuel received by the auxiliary fluid delivery system.

3. The fluid delivery system of claim 2, wherein the auxiliary fluid delivery system includes an accumulator in fluid communication with the orifice and an injector in fluid communication with the accumulator.

4. The fluid delivery system of claim 1, wherein the primary fuel supply system further includes a pump component positioned downstream of the low-pressure fluid pump, and wherein the primary coupler is configured to divert fuel from an outlet side of the pump component.

5. The fluid delivery system of claim 4, wherein the pump component is configured to meter the delivery of fuel to the high-pressure fluid pump.

6. The fluid delivery system of claim 4, wherein the primary fuel supply system is configured to deliver the fuel to an internal combustion engine for generating mechanical power.

7. The fluid delivery system of claim 1, wherein the second pressure range of the fuel delivered from the high-pressure fluid pump is from forty thousand to two hundred fifty thousand kilopascals (40,000-250,000 kPa).

8. The fluid delivery system of claim 1, wherein the second pressure range of the fuel delivered from the high-pressure fluid pump is from seventy-five thousand to one hundred fifty thousand kilopascals (75,000-150,000 kPa).

9. The fluid delivery system of claim 1, wherein the first pressure range of the fuel exiting the from the low-pressure fluid pump is in the range of three hundred to three thousand kilopascals (300-3,000 kPa).

10. An apparatus for diverting fluid, the apparatus comprising:

a primary coupler having a coupler fluid inlet passage and a coupler fluid outlet passage, the primary coupler operably connected to a port of a suction-side fluid cavity of a high-pressure fluid pump, the port being formed about a central axis;

a pump component having a component fluid inlet and a component fluid outlet, the pump component adapted to perform a pump function for the high-pressure fluid pump, the pump component adapted to receive a low-pressure fluid from the primary coupler;

a diverter fluid passage configured to divert a low-pressure fluid from the primary coupler to an auxiliary fluid delivery system; and wherein the port comprises a port fluid outlet passage that is in fluid communication with the low-pressure fluid that is received from an internal passage of the high-pressure fluid pump and a port fluid inlet passage that is in communication with the suction-side fluid cavity;

wherein the coupler fluid inlet passage of the primary coupler is configured to communicate the low-pressure fluid between the port fluid outlet passage, the diverter fluid passage, and the component fluid inlet; and wherein a coupler fluid outlet passage of the primary coupler is configured to communicate a low-pressure fluid downstream of the pump component between the component fluid outlet and the port fluid inlet passage.

11. The apparatus of claim 10, wherein the pump component is connected to the primary coupler and disposed at a ninety-degree angle to the central axis of the port.

12. The apparatus of claim 10, wherein the pump component is connected to the primary coupler and disposed in-line to the central axis of the port.

13. The apparatus of claim 10, wherein the auxiliary fluid delivery system includes an auxiliary connector that is a tubing connector.

14. The apparatus of claim 10, wherein the pump component is configured to meter the delivery of fuel to the high pressure fluid pump.

* * * * *